Figure 7:
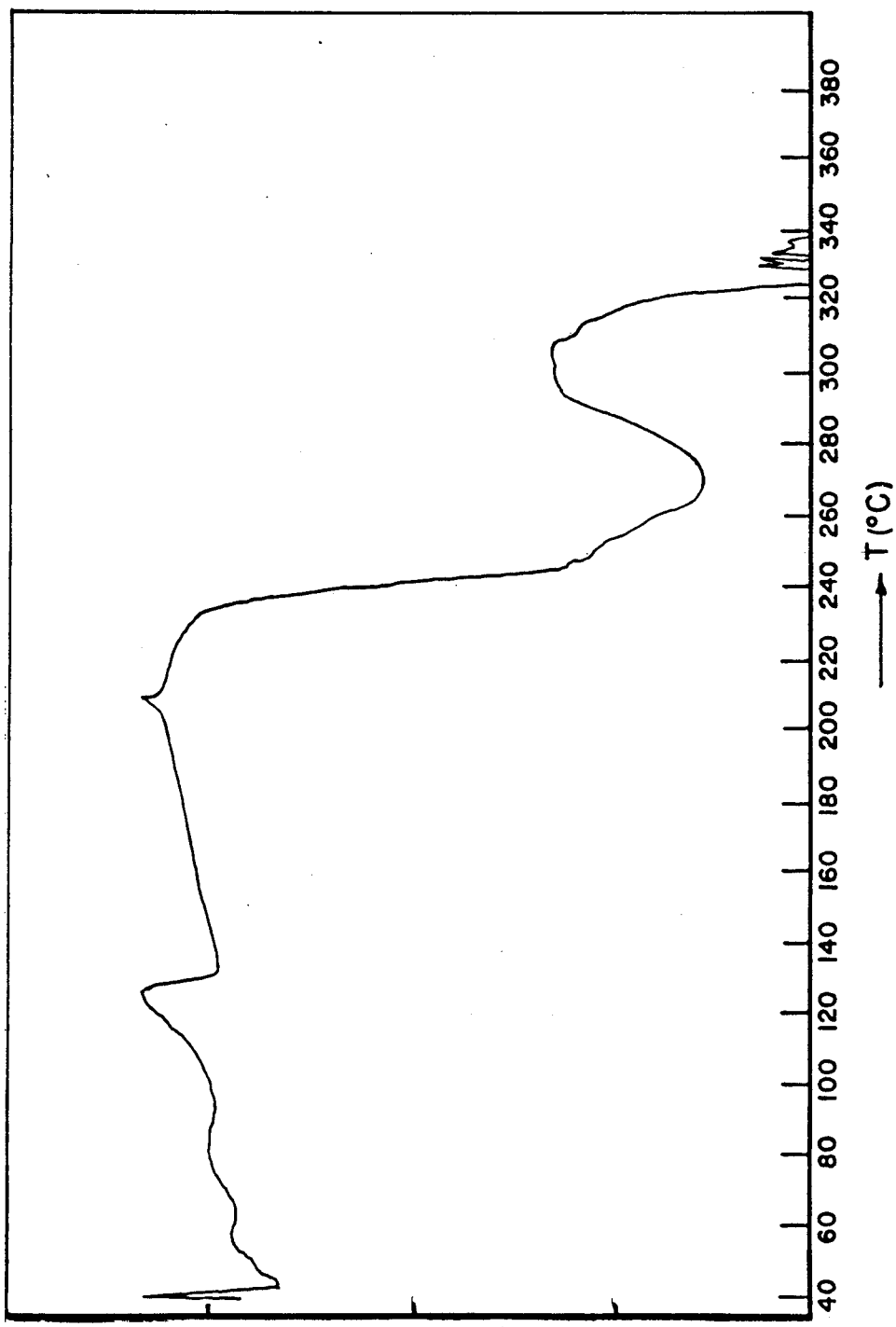

United States Patent [19]

van Groep

[11] Patent Number: 5,001,195

[45] Date of Patent: Mar. 19, 1991

[54] POLYMER COMPOSITION, A PROCESS FOR ITS MANUFACTURE, AND A THERMOPLASTIC POLYMER COMPOSITION

[76] Inventor: L. A. van der Groep, 1112 HN Diemen, Gersthove 33, Netherlands

[21] Appl. No.: 516,709

[22] Filed: Apr. 30, 1990

Related U.S. Application Data

[60] Division of Ser. No. 266,817, Nov. 3, 1988, which is a continuation of Ser. No. 167,697, Mar. 14, 1988, Pat. No. 4,877,827.

[30] Foreign Application Priority Data

Mar. 13, 1987 [NL] Netherlands .......................... 8700606
Nov. 5, 1987 [NL] Netherlands .......................... 8702640

[51] Int. Cl.$^5$ ...................... C08L 23/10; C08L 77/00; C08L 67/00; C08L 25/04; C08L 33/10
[52] U.S. Cl. ...................................... 525/222; 525/84; 525/99; 525/148; 525/166; 525/179; 525/229
[58] Field of Search ................ 525/222, 166, 179, 229

[56] References Cited

U.S. PATENT DOCUMENTS

| | | | |
|---|---|---|---|
| 3,205,186 | 9/1965 | Zaayenga | 524/477 |
| 3,361,852 | 1/1968 | Bassett et al. | 525/222 |
| 3,941,859 | 3/1976 | Batink et al. | 525/211 |
| 4,032,600 | 6/1977 | McAdams et al. | 525/211 |
| 4,076,698 | 2/1978 | Anderson et al. | 526/348.6 |
| 4,537,935 | 8/1985 | Yoshimura et al. | 525/222 |
| 4,639,487 | 1/1987 | Hazelton et al. | 524/425 |
| 4,713,419 | 12/1987 | Takimoto et al. | 525/211 |

FOREIGN PATENT DOCUMENTS

158422-A 10/1985 European Pat. Off. .
62-187779 8/1987 Japan .

*Primary Examiner*—Carman J. Seccuro
*Attorney, Agent, or Firm*—Michael L. Keller

[57] ABSTRACT

This invention relates to a polymer composition comprising per 100 parts by weight of the composition
 (a) 30-60 parts by weight of copolymer of ethylene and 1-olefin having at least 6 C atoms,
 (b) 35-65 parts by weight of copolymer of ethylene and vinyl acetate,
 (c) 1-10 parts by weight of ethylene-propylene-diene rubber,
said polymer composition being obtained by reaction at elevated temperature of the components.

4 Claims, 5 Drawing Sheets

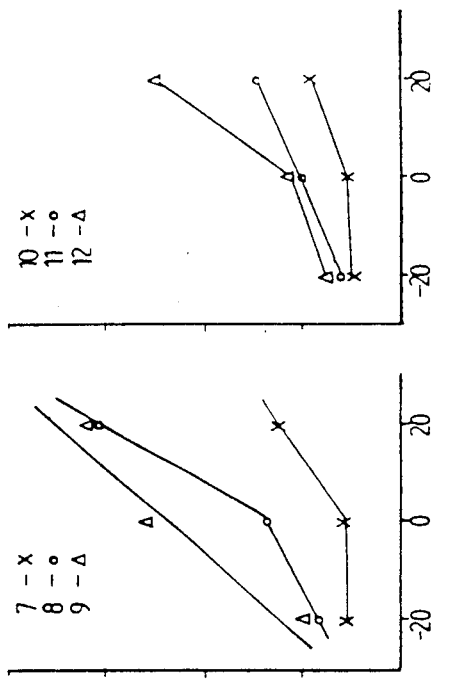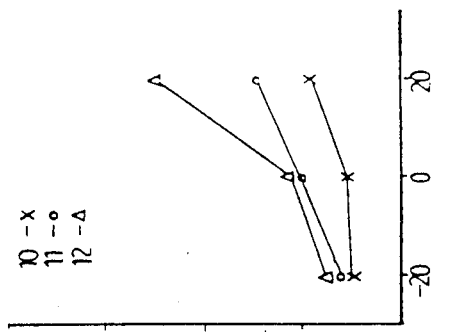

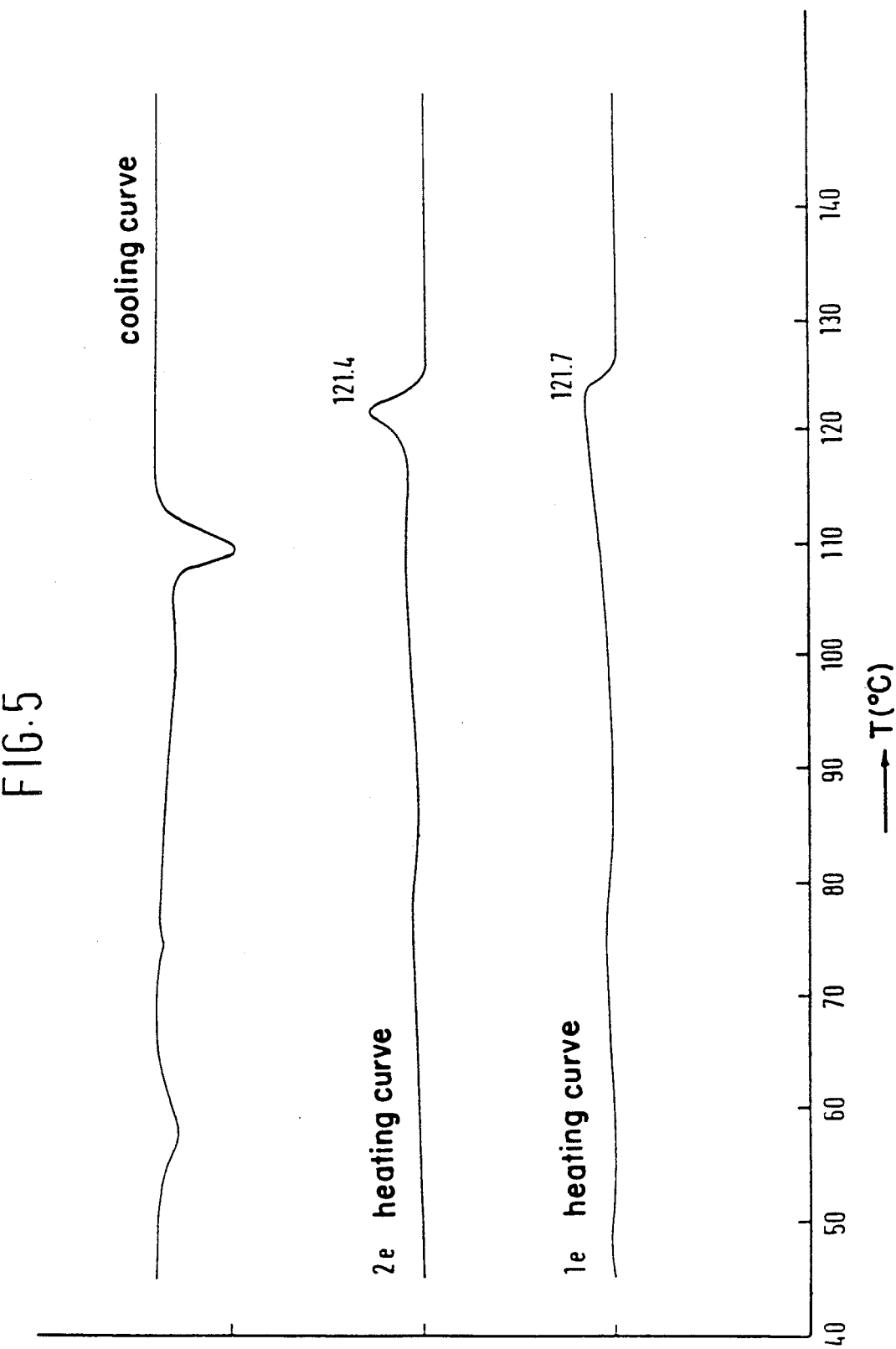

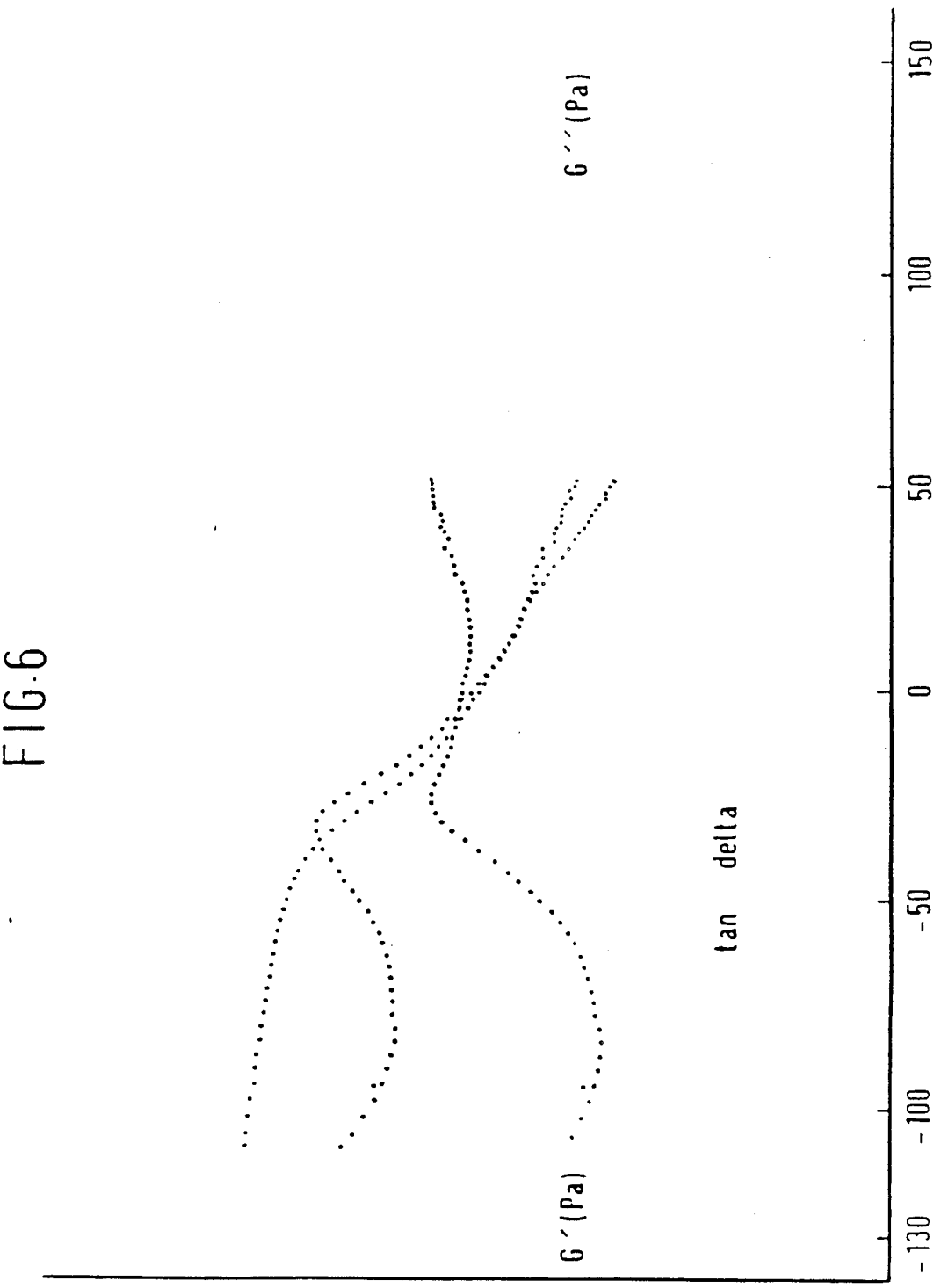

POLYMER COMPOSITION, A PROCESS FOR ITS MANUFACTURE, AND A THERMOPLASTIC POLYMER COMPOSITION

This invention relates to a polymer composition, its manufacture, and its use, more in particular in thermoplastic polymer compositions.

It is common practice in the plastics industry that all kinds of additives are added to plastics so as to affect certain properties thereof. Conventional additives are, inter alia, antioxidants, colorants, flow improvers and mould release agents.

A drawback of the addition of this type of additives often is that other properties of the plastic are negatively affected. This is often undesirable.

An object of this invention is to provide a processing aid for plastics, more in particular thermoplastics, which hardly, if at all, produces a negative effect on the properties of the plastic.

Another object of this invention is to provide a universal flow improver for polyolefins, more in particular for polypropylene and propylene copolymers.

In general, the conventional flow improvers for plastics have a limited effective range. Moreover, these compounds often adversely affect the other essential properties of the plastic, so that it is preferred in the plastics industry to produce more than one type of each plastic, which types differ from each other with respect to flow behaviour or melt index.

Of course, it would be a distinct advance if there could be developed a flow improver which renders it possible, starting from one type of plastic having a lowest possible melt index, to obtain the desired flow properties by addition of the flow improver.

In the not prepublished European patent application 287,140 which corresponds to U.S. Pat. No. 4,877,827, the contents of which is incorporated herein by reference, of the same applicant, an additive for plastics is described comprising a polymer composition based on at least three different plastics, namely, an EP or EPDM rubber, an EVA and one or more other polymers. The most important property of this additive is to improve the miscibility with each other of intrinsically immiscible polymers. This additive, however, also has a positive effect on the flow and the mould release.

The present invention relates to a polymer composition comprising per 100 parts by weight of the composition (a) 30-60 parts by weight of copolymer of ethylene and 1-olefin having at least 6 C atoms,
(b) 35-65 parts by weight of copolymer of ethylene and vinyl acetate,
(c) 1-10 parts by weight of ethylene-propylene-diene rubber, said polymer composition being obtained by reaction at elevated temperature of the components.

The 1-olefin contains at least 6 C atoms and preferably not more than 10 C atoms. Suitable 1-olefins are 1-hexene and 1-octene.

The copolymer of ethylene and 1-olefin is preferably an ethylene-hexene copolymer having 1-15 mole % hexene. The melt index of this copolymer preferably ranges between 0.5 and 25 g/10 min.

Surprisingly, it has been found that such a polymer composition shows a number of excellent properties which render the composition eminently suited for modifying the properties of plastics.

First of all, the polymer composition is very suitable as a processing aid in all types of thermoplastics. Examples are in particular styrene polymers, such as polystyrene, HIPS, MIPS, ABS, SAN and the like, polyamides, polyesters, acrylic polymers, such as PMMA, PPO, polycarbonate, and more in particular polyolefins.

The use in such thermoplastics of a slight amount of the polymer composition according to this invention results in a reduced stick in the mould, an improved surface, i.e., fewer flow lines on the surface, and in addition in a much improved dimensioning and reduced spreading in the dimensioning. The use of the polymer composition according to this invention permits a very high accuracy of injection moulding. The reason for this phenomenon is not clear, but it has been observed that the melt in which the polymer composition according to this invention is included has a homogeneous character.

A second effect of the polymer composition according to this invention is the influence on the flow behaviour of thermoplastics of the type as defined above, and more in particular of polyolefins.

Surprisingly, it has been found that the flow behaviour of all types of polymers can be very easily adjusted with such a polymer composition. The influence of the polymer composition on the melt index can be adjusted by varying the melt index of component a, the ethylene-1-olefin copolymer. When using a very high melt index, e.g., 20-25, and adding, e.g., 2.5% by weight of the polymer composition to polypropylene having a melt index of 1, a product is obtained which finally has flowability comparable to a material with a melt index of 6.

Thus, starting from one polyolefin or other plastic, a wide range of products can be prepared by simply admixing a slight amount of the flow improver according to this invention. From the viewpoint of utilizing production capacity this is of course very advantageous, because now only one type of plastic needs to be produced so that the time required for type changes is no longer lost. This also becomes effective production time.

This invention therefore also relates to a thermoplastic polymer composition comprising one or more thermoplastics, conventional additives, and, based on the weight of the polymer composition, 0.1-15% of the polymer composition.

More in particular, this invention also relates to a propylene polymer composition, comprising (1) 0.1-15 parts by weight of polymer composition comprising per 100 parts by weight of the composition
   (a) 30-60 parts by weight of copolymer of ethylene and 1-olefin having at least 6 C atoms,
   (b) 35-65 parts by weight of copolymer of ethylene and vinyl acetate,
   (c) 1-10 parts by weight of ethylene-propylenediene rubber,
said polymer composition being obtained by reaction at elevated temperature of the components,
(2) 85-99.9 parts by weight of polypropylene and/or propylene copolymer, and
(3) conventional additives.

Such a propylene polymer moulding composition has a number of very important advantages, depending on the nature of the selected starting propylene polymer as well as on the amount and specific makeup of the polymer composition.

An example of such an improvement of properties can be found, e.g., in the improved clearness of random or homopolypropylene. The use of the polymer composition according to this invention enables the manufacture of a product that is substantially clearer than the starting product. Improved clearness is generally also obtainable by combining LLDPE or VLDPE with polypropylene, but this nearly always causes processing problems and/or mechanical or optical defects in the end product, whereas such problems do not occur when the polymer composition according to the invention is used. Moreover, it is possible to make a combination of LLDPE or VLDPE with polypropylene and the polymer composition according to the invention, which not only is excellently processable but also shows a clearness excellent for polypropylene.

It is also possible to produce mixtures of polypropylene and HDPE by using the polymer composition according to the invention. The weight ratio of PP and HDPE generally ranges between 5-95 and 95-5. These mixtures are not clear but cannot be produced without using the polymer composition according to the invention. If required, the clearness can be further improved by including 5-15 parts by weight of VLDPE. The advantages of such compositions reside in that by means of simple propylene polymers, products can be prepared which have a pattern of properties comparable or superior to the best commercially available propylene copolymers. Of course, it is very advantageous if such results can be obtained using homopolymers, because their manufacture is much easier and cheaper.

Using the polymer composition according to this invention, polypropylene can be modified so as to obtain a more rigid, more impact resistant and clearer product having a higher flowability than the conventional, highly impact resistant propylene copolymers.

More in particular, this invention therefore relates to a propylene polymer composition, comprising
(a) 90-99.9 parts by weight of a mixture of
  ($a_1$) 5-95% by weight of polypropylene
  ($a_2$) 5-95% by weight of high-density polyethylene,
  and ($a_3$) 0-25% by weight of one or more other polymers,
(b) 0.1-10 parts by weight of the polymer composition according to the invention, and
(c) 0-15 parts by weight of other additives.

According to a preferred embodiment of this aspect of the invention the amount of polypropylene in component (a) is 50-95% more preferred 75-95% by weight, while the amount of high-density polyethylene is 5-50%, more preferred 5-25% by weight. Suitable third components are the different polyolefins, such as other polypropylene types, LLDPE, VLDPE, LDPE and the like. If desired, it is also possible to include minor amounts of a non-olefinic polymer as third component. Suitable non-olefinic polymers are, e.g., styrene polymers, rubbers, polyamides, polyesters etc.

According to another preferred embodiment of the invention the polymer composition is used in a thermoplastic polymer which is no propylene polymer, such as polyethylene, styrene polymers, rubbers, polyamides, polyesters, etc.

The polymer composition according to the invention is produced by reaction of the components with each other at elevated temperature. In this connection it is important that at least for a part of the reaction time the temperature of the mixture should be at least 200° C., preferably at least 235° C. In the manner known in the plastics industry the components can be mixed with each other in a single-or double-screw extruder or in an internal mixer, such as a Banbury, Henschel or a Pappenmeier. A continuous production is preferred, so that an extruder is preferably used. It is then important that the screw configuration and the heating of the extruder be such that a reaction will occur. The melt of the polymer composition obtained after the reaction is then suitably processed further, e.g., to a granular form.

When using the flow improver or polymer composition according to the invention, it is essential that this be produced separately and then be added to the polymer, wherein it is to be incorporated. When the individual components are added to the polymer in a correct ratio, the desired effect will not be obtained.

This invention also relates to a process for the production of a polymer composition, which is characterized in that the components are reacted at elevated temperature, which temperature must attain at least 200° C.

A further important advantage of the polymer composition according to this invention is that it improves the dispersion of filler by its influence on the polymer to which it is added. This often results in a more uniform pattern of properties.

Surprisingly it has further been found that the polymer composition according to the invention when used in small amounts has a positive effect on the gloss. The amount, however, is then from about 0.1 to about 0.5% by weight.

Finally, the polymer composition according to this invention is found to improve the mechanical properties, such as impact strength and elongation at break of a polymer to which the composition is added.

As already indicated above, the polymer composition comprises 30-60, more in particular, 40-55% by weight of a copolymer of ethylene and at least 1-olefin. This olefin should comprise at least 6 carbon atoms. In practice, this means that hexene-1 and octene-1 are particularly suitable. Higher olefins can be used but have no additional advantages per se. The 1-olefin content of the copolymer preferably ranges between 1 and 15 mole %, because these contents give the best results. The production of these copolymers is extensively documented and generally occurs using the known catalysts on the basis of transition metals in solvent.

The second component of the polymer composition according to this invention is a copolymer of ethylene and vinyl acetate. The vinyl acetate content preferably ranges between 25 and 45% by weight, a vinyl acetate content of 25-35% by weight being especially preferred. Such products are also commercially sold and are generally produced by high-pressure radical mass polymerization.

The third component of the polymer composition according to this invention is an ethylene-propylenediene rubber, a so-called EPDM rubber. Such rubbers are obtained by solution polymerization of the components in a suitable solvent, in the presence of a transition metal catalyst. The diene is a non-conjugated diene, such as ethylidene-norbornene; dicyclopentadiene, or 1,4-hexadiene. Other, non-conjugated dienes, or mixtures of two or more non-conjugated dienes are also very suitable.

The last component of the polymer composition which may be present, if required, e.g., in an amount of 0.1-10 parts by weight is a wax, such as a microcrystalline wax or a polyolefin wax. Preference is given to using a polyolefin wax, more in particular a polypropylene wax, or a mixture of two or more polypropylene waxes having a different melt index. The advantage of using a wax resides in the possibility of obtaining an even more accurate adjustment of the effect as flow improver. However, the presence of this wax is not necessary.

The polymer composition according to this invention may also comprise other additives, if required, such as antioxidant etc. However, these should not interfere with the reaction that has to take place during the production of the polymer composition.

As already indicated, the polymer composition should be produced separately and may then be added to the plastic in which it has to be included, in the conventional manner, such as all the other additives. The polymer composition can be directly added in granulate form to the hopper of an extruder, a dry blend may be made of the additives, a premix may be made of the additives, etc. One possibility that should not be ignored is formed by making a kind of concentrate of the polymer composition according to this invention in the polymer to which the polymer composition has to be added. For instance, a mixture comprising 40-70% by weight of the polymer composition and 30-60% by weight of the base polymer may be made, which mixture may be added to the polymer.

A rather surprising property of the polymer composition of the invention is the ability to evaporate completely upon heating in an inert gas atmosphere. It has been found in high temperature DSC-analysis, that when using nitrogen as the purge gas, the composition can evaporate completely, leaving no residue. This opens the possibility to use the composition of the present invention for surface treatment of objects, by evaporating the composition, and precipitating the vapour on the surface of some object. At the same time it is an indication, that the composition is not a mere mixture of components, but a reaction product.

Another possible embodiment of the present invention is the combined use of the polymer composition of the present invention, in admixture with the composition disclosed in the European patent application No. 287,140. This composition has the ability to compatibilize all kinds of incompatible polymers and comprises the reaction product of 30-70 weight parts of one or more ethylenepropylene rubbers, 30-70 weight parts of one or more ethylene-vinylacetate copolymers and one or more other polymers.

This embodiment is especially preferred in case the superior compatibilizing action of the product of EP-A 287,140 is to be combined with the action of the composition of the present invention. The relative weight ratio between the two components is usually between 1:10 and 10:1.

The invention will now be explained with reference to some examples, but should not be interpreted as limited thereto.

EXAMPLE 1

A mixture comprising 50 parts by weight of ethylene-hexene copolymer (ATO-HX-5600), 45 parts by weight of EVA (Evathane 28% VA), and 5 parts by weight of EPDM (Buna 734 AP) was added to an extruder adjusted to 275° C. The resulting reaction product was granulated. From this product a DSC curve was determined. Purge gas used was nitrogen The result thereof is given in FIG. 5.

Also the torsion dam ping curves were determined, which are given in FIG. 6.

Figure 8:
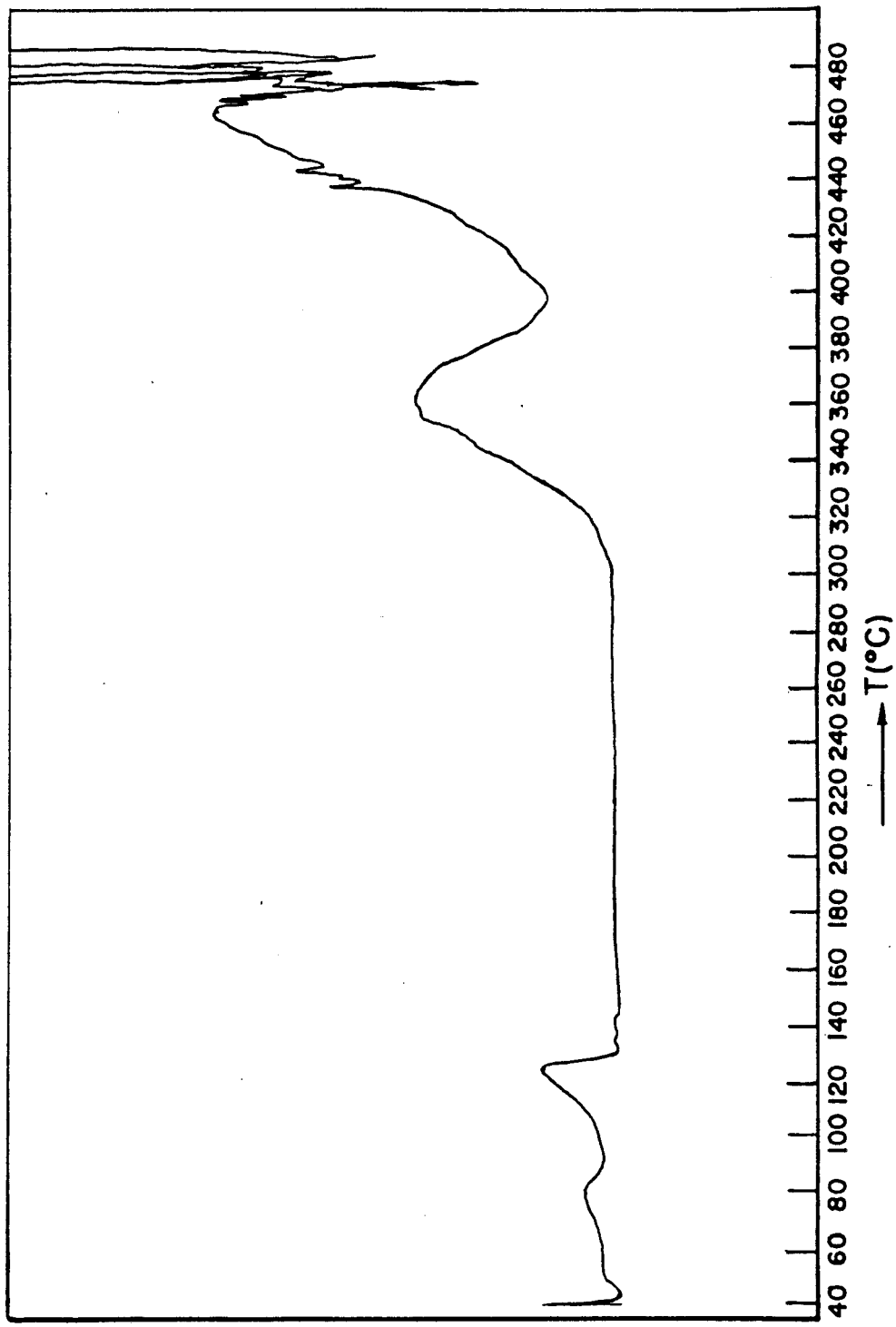

Surprising results were obtained in the high temperature DSC analysis, wherein the product was heated using as purge gas air and nitrogen, respectively. The use of purge gas:air, gave the enclosed FIG. 7, whereas purge gas:nitrogen gave the enclosed FIG. 8. As the behaviour of the product at temperatures above 400° C. was contrary to any expectation, the sample was visually inspected after the end of the analysis. It was then found that this behaviour was due to a complete evaporation of the sample This is clear evidence that some kind of reaction has occurred with the product, as the various components as such decompose at these temperatures, leaving residues in the sample pen.

EXAMPLES 2 AND 3

3 parts by weight of the product of Example 1 were mixed with 97 parts by weight of glass fiber-filled (38%) polyester (Arnite AV2 370) The flow of the polyester was improved by a factor of 2.1.

When 5 parts by weight of the product of Example 1 were used in 95% by weight of polyester, the flow was improved at least by a factor of 2.7. The mould pressure required decreased from 169 bar (polyester) to 144 bar (with addition)

The mould temperature can be adjusted to 50° C. both with 3% and with 5% addition, without the mechanical properties deteriorating Without addition a mould temperature of at least 130° C. is necessary.

EXAMPLE 4

A blend was prepared consisting of 97 wt. % of propylene ethylene copolymer, 1 wt. % of the product of Example 1, and 2 wt. % of the product as prepared in accordance with Example 5 of European patent application no. 287,140. From this blend filter components were injection moulded, which had excellent flatness, excellent dimension stability and close tolerances. Reduction of cycle time with 30% due to reduction of cooling time and after-pressure time could be obtained. Also a reduction of cylinder temperature of about 20° C. was obtained.

The same result was obtained with a blend consisting of 98 wt. % of said propylene copolymer, and 2 wt. % of the product of Example 1.

EXAMPLE 5

A blend was prepared of polystyrene (Polystyrol 3710) with 1,5 wt. % of the product of Example 1. From this blend injection moulded objects were prepared. The cycle time, which was 17.5 seconds for pure polystyrene, could be reduced to 10.5 seconds for the blend.

EXAMPLE 6

A blend of polystyrene and waste polymethyl methacrylate, with 1% of the product of Example 1 and 2% of the product of Example 5 of European patent application no. 287.140, was blow moulded to objects. The products obtained had a high gloss, and showed no delamination.

EXAMPLE 7

AND COMPARATIVE EXAMPLES

Household crates were injection moulded from a 50/50 blend of a propylene copolymer (Stamylan 46m10) and a HDPE (rigidex 5211), and from the same blend with 3 wt. % of the product of Example 1 added thereto. The results of the testing of the mechanical properties are summarized in the table. In this test use is made of the crack-toughness test as described in Kunststoffe 7c (1980), 12, pp. 844-849. The result of such test is designated as specific strain ($\epsilon$)

TABLE 1

| Example | +20° C. | | | | −20° C. | | | |
|---|---|---|---|---|---|---|---|---|
| | $e_s \|\|$ (%) | t/b* | $e_s$ (%) | t/b* | $e_s \|\|$ (%) | t/b* | $e_s$ (%) | t/b* |
| | 23,9 | t | 32,9 | t | 14,9 | t | 22,6 | t |
| 8 Comp. | 18,4 | t** | 34,1 | t** | 8,7 | t/b | 22,6 | t** |

*t: tough;
b: brittle
**delamination

A feet rest, from Escorene LD650 could be injection moulded at a cylinder temperature of 130° C., using 1.5 wt. % of the product of Example 1. Without this addition the cylinder temperature had to be 200° C. At the same the cycle time could be reduced from 80 seconds to 60 seconds. The core of the foot rest crystallizes fast, and the product has a good surface, and the texture of the surface is very clear and glossy, which is not the case with the product without the addition.

EXAMPLE 8

A blend of Vistaflex 714B with 1,5 wt. % of the product of Example 1 could be used for preparing shock absorbers with a cycle time of 45 seconds and a cylinder temperature of 140° C. Without the addition of the product of Example 1 the cycle time was 75 seconds and the cylinder temperature had to be 200° C.

According to the invention the product could be removed from the mould without problems, which is not the case with the comparative product.

EXAMPLE 9

Road signs were prepared from polypropylene, and were tested at −20° C. The polypropylene was Stamilan P48m10, having a melt index of 14 g/10 min. The $\epsilon s$ at −20° C. of the propylene, containing 2 wt. % of master batch on the basis of the product of the European patent application no. 287.140 was 10,58. With the addition of 2.5 wt. % of the product of Example 1, this value was 12,9.

EXAMPLES-10-11

AND COMPARATIVE EXAMPLE.

Household crates were injection moulded from high density polyethylene, melt index 24, density 953 kg/m³. The crack toughness tested −20° C. yielded values of 4,25 (parallel) and 4,71 (perpendicular). Both methods yielded brittle fractures.

The same high density polyethylene, mixed with polypropylene waste, in 1/1 weight ratio with 5 wt. % of the product of Example 1 yielded the value in the crack toughness test at −20° C. of 7,1 (parallel) and 9,96 (perpendicular). Both fractures were tough.

A blend of high density polyethylene and polypropylene (Rigidex 52,11; melt index 11, density 952 kg/m³; Stamylan P46M10) in a weight ratio 1:1, with 5 wt. % of the product of Example 1 added thereto was used for preparing household crates. In the crack toughness test the products showed high toughness and tough fractures. The $\epsilon s$ (parallel), −20° C. yielded 14,9 and the $\epsilon s$ (perpendicular, −20°) yielded 22,6.

EXAMPLE 12

A series of blends were prepared from various polypropylenes, in combination with VLDPE, which blends were compared with representative, commercially available propylene copolymers. In Table 2 the composition of the various blends is summarized, whereas the results are given in the enclosed four figures. In each of the four figures the upper graph gives the properties in the crack toughness test at −20°, 0° and 20° C. of both the basic polypropylene and the modified polypropylene, whereas the lower graph gives the same properties for the propylene copolymer.

TABLE 2

| | Composition | | | | | | | | | |
|---|---|---|---|---|---|---|---|---|---|---|
| | Polypropylene | | | | Propylene copolymer | | | | | |
| Blend | A | B | C | D | E | F | G | H | VLDPE | Ex 1 |
| 1 | 100 | — | — | — | — | — | — | — | — | — |
| 2 | 80 | — | — | — | — | — | — | — | 15 | 5 |
| 3 | 75 | — | — | — | — | — | — | — | 20 | 5 |
| 4 | — | 100 | — | — | — | — | — | — | — | — |
| 5 | — | 80 | — | — | — | — | — | — | 15 | 5 |
| 6 | — | 75 | — | — | — | — | — | — | 20 | 5 |
| 7 | — | — | 100 | — | — | — | — | — | — | — |
| 8 | — | — | 80 | — | — | — | — | — | 15 | 5 |
| 9 | — | — | 75 | — | — | — | — | — | 20 | 5 |
| 10 | — | — | — | 100 | — | — | — | — | — | — |
| 11 | — | — | — | 80 | — | — | — | — | 15 | 5 |
| 12 | — | — | — | 75 | — | — | — | — | 20 | 5 |
| 13 | — | — | — | — | 100 | — | — | — | — | — |
| 14 | — | — | — | — | — | 100 | — | — | — | — |
| 15 | — | — | — | — | — | — | 100 | — | — | — |

TABLE 2-continued

| Blend | Polypropylene | | | | Propylene copolymer | | | | VLDPE | Ex I |
|---|---|---|---|---|---|---|---|---|---|---|
| | A | B | C | D | E | F | G | H | | |
| 16 | — | — | — | — | — | — | — | 100 | — | — |

A: EP2S12B Random PP
B: EP2S30B Random PP
C: EP2S30S Homo PP (m.i.: 1.5)
D: X30S Homo PP (m.i.: 7)
E: Stamylan 56M10 Co-polypropylene (m.i.: 6)
F: Stamylan 46M10 Co-polypropylene (m.i.: 5)
G: Stamylan 83MF10 Co-polypropylene (m.i.: 1.5)
H: Stamylan 48M10 Co-polypropylene (m.i.: 14)
VLDPE: Norsoflex F10 1400.

EXAMPLE 13

AND COMPARATIVE EXAMPLE

Medium impact polystyrene was blended with 2 wt. % of the product of Example 1. This blend and the virgin medium impact polystyrene were injection moulded, and samples were made from the injection moulded object perpendicular to the flow direction. The samples were tested in accordance with ISO/R527, type A ISO II with a speed of 5 cm/min. and a length of the sample of 50 mm, at 32° C. The melt temperature during injection moulding was 244° C. and the mould temperature was 62° C. In Table 3 some of the results of the two experiments are given

TABLE 3

| Blend MIPS | (wt. %) Ex I | $G_v$ (N/mm$^2$) | $G_B$ (N/mm$^2$) | $\epsilon_b$ (%) |
|---|---|---|---|---|
| 100 | — | 25 | 26,0 | 16,4 |
| 98 | 2 | 24,6 | 26,5 | 20,4 |

From this table it follows that the GV (the flow stress, which is related to the E modulus, remains substantially at the same level, which also applies to the VB. However, the stretch at fracture, $\epsilon_b$ is tremendously increased, especially for polystyrene.

EXAMPLE 14

Two blends on the basis of high molecular weight high density polyethylene and polypropylene were prepared, one consisting of 80 wt. parts of high molecular weight high density polyethylene (M.I. 0,1) and 20 wt. parts polypropylene (Hoechst PPT1770, melt index is 8) and the second consisting of the same amount of polypropylene, 75 wt. parts of the high density polyethylene, and 5 weight parts of the product of Example 1.

From these blends film was moulded, whereby the blend consisting of HDPE and TP gave an instable balloon, which broke down and could not be prosecuted further. Any film to be obtained from this blend was hard and brittle. The blend also containing the product of Example 1, could be prepared to a glossy tough film of 20 μm thickness, whereby during preparation the balloon was very stable.

I claim:

1. A thermoplastic polymer composition having improved flow properties, comprising a thermoplastic polymer and 0.5-15% by weight (based on the moulding composition) of a polymer composition comprising per 100 parts by weight of the composition
   (a) 30-60 parts by weight of copolymer of ethylene and 1-olefin having at lest 6 C atoms
   (b) 35-65 parts by weight of copolymer of ethylene and vinyl acetate,
   (c) 1-10 parts by weight of ethylene-propylene-diene rubber, said polymer composition being obtained by reaction of the components at a temperature of at least 200 C.

2. A thermoplastic polymer composition according to claim 1, characterized in that the thermoplastic polymer is a polyolefin resin, a polyamide and/or a polyester.

3. A propylene polymer composition, comprising
   (1) 0.1-15 parts by weight of polymer composition comprising per 100 parts by weight of the composition
      (a) 30-60 parts by weight of copolymer of ethylene and 1-olefin having at least 6 C atoms,
      (b) 35-65 parts by weight of copolymer of ethylene and vinyl acetate,
      (c) 1-10 parts by weight of ethylene-propylene-diene rubber,
   said polymer composition being obtained by reaction of the components at a temperature of at least 200 C.,
   (2) 85-99.9 parts by weight of polypropylene and/or propylene copolymer, and
   (3) optionally other additives.

4. A propylene polymer composition according to claim 3, comprising
   (I) 90-99.9 parts by weight of a mixture of
      (i) 50-95% by weight of polypropylene
      (ii) 5-50% by weight of high-density polyethylene, and
      (iii) 0-25% by weight of one or more other polymers,
   (II) 0.1-10 parts by weight of said polymer composition, and
   (III) 0-15 parts by weight of other additives.

* * * * *